(12) United States Patent
Hill

(10) Patent No.: US 7,009,711 B2
(45) Date of Patent: Mar. 7, 2006

(54) RETROREFLECTOR COATING FOR AN INTERFEROMETER

(75) Inventor: Henry A. Hill, Tucson, AZ (US)

(73) Assignee: Zygo Corporation, Middlefield, CT (US)

(*) Notice: Subject to any disclaimer, the term of this patent is extended or adjusted under 35 U.S.C. 154(b) by 337 days.

(21) Appl. No.: 10/412,617

(22) Filed: Apr. 11, 2003

(65) Prior Publication Data
US 2003/0223080 A1 Dec. 4, 2003

Related U.S. Application Data

(60) Provisional application No. 60/371,868, filed on Apr. 11, 2002.

(51) Int. Cl.
G01B 9/02 (2006.01)
G02B 27/28 (2006.01)

(52) U.S. Cl. .................................. 356/493; 359/495

(58) Field of Classification Search ............... 359/495, 359/496; 356/498, 492, 494, 493, 487
See application file for complete search history.

(56) References Cited

U.S. PATENT DOCUMENTS 5,483,343 A    1/1996  Iwamoto et al.
5,801,832 A    9/1998  Van Den Brink 6,198,574 B1 *  3/2001  Hill .......................... 359/494

FOREIGN PATENT DOCUMENTS

GB           2 070 276 A      9/1981

OTHER PUBLICATIONS

Paul Mauer, "Phase Compensation of Total Internal Reflection", Journal of the Optical Socient of America, vol. 56, No. 9, pp. 1219-1221 (Sep. 1966).*
M.A. Player, "Polarization properties of a cube-corner reflector", Journal of Modern Optics, vol. 35, No. 11, pp. 1813-1820 (1988).*
Paul Mauer, "Phase Compensation of Total Internal Reflection", *Journal of the Optical Society of America*, vol. 56, No. 9, pp. 1219-1221 (Sep., 1966).
M.A. Player, "Polarization properties of a cube-corner reflector", *Journal of Modern Optics*, vol. 35, No. 11, pp. 1813-1820 (1988).
Chien-Ming Wu, et al., "Analytical modeling of the periodic nonlinearity in heterodyne interferometry", *Applied Optics*, vol. 37, No. 28, pp. 6696-6700 (Oct. 1, 1998).

* cited by examiner

*Primary Examiner*—Patrick J. Connolly
(74) *Attorney, Agent, or Firm*—Fish & Richardson P.C.

(57) ABSTRACT

A corner cube retroreflector having a coating including one or more layers at each reflecting surface. The coating causes the retroreflector to have polarization eigenstates that are substantially linear and to have the properties of a half-wave plate. The coated retroreflector can be used in interferometry and microlithography system.

44 Claims, 11 Drawing Sheets

RETROREFLECTOR COATING FOR AN INTERFEROMETER

CROSS-REFERENCE TO RELATED APPLICATIONS

Under 35 U.S.C. §119(e), the application claims priority to U.S. Provisional Patent Application Ser. No. 60/371,868 filed Apr. 11, 2002 by Henry A. Hill. The contents of said Provisional Patent Application be incorporated herein by reference.

BACKGROUND

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer.

The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where $v$ is the relative speed of the measurement and reference objects, $\lambda$ is the wavelength of the measurement and reference beams, $n$ is the refractive index of the medium through which the light beams travel, e.g., air or vacuum, and $p$ is the number of passes to the reference and measurement objects. Changes in the relative position of the measurement object correspond to changes in the phase of the measured interference signal, with a $2\pi$ phase change substantially equal to a distance change L of $\lambda/(np)$, where L is a round-trip distance change, e.g., the change in distance to and from a stage that includes the measurement object.

Unfortunately, this equality is not always exact. In addition, the amplitude of the measured interference signal may be variable. A variable amplitude may subsequently reduce the accuracy of measured phase changes. Many interferometers include non-linearities such as what are known as "cyclic errors." The cyclic errors can be expressed as contributions to the phase and/or the intensity of the measured interference signal and have a sinusoidal dependence on the change in optical path length pnL. In particular, the first harmonic cyclic error in phase has a sinusoidal dependence on $(2\pi pnL)/\lambda$ and the second harmonic cyclic error in phase has a sinusoidal dependence on $2(2\pi pnL)/\lambda$. Higher harmonic cyclic errors and sub-harmonic errors can also be present.

Cyclic errors can be produced by "beam mixing," in which a portion of an input beam that nominally forms the reference beam propagates along the measurement path and/or a portion of an input beam that nominally forms the measurement beam propagates along the reference path. Such beam mixing can be caused by misalignment of interferometer with respect to polarization states of input beam, birefringence in the optical components of the interferometer, and other imperfections in the interferometer components, e.g., imperfections in a polarizing beam-splitter used to direct orthogonally polarized input beams along respective reference and measurement paths. Because of beam mixing and the resulting cyclic errors, there is not a strictly linear relation between changes in the phase of the measured interference signal and the relative optical path length pnL between the reference and measurement paths. If not compensated, cyclic errors caused by beam mixing can limit the accuracy of distance changes measured by an interferometer. Cyclic errors can also be produced by imperfections in transmissive surfaces that produce undesired multiple reflections within the interferometer and imperfections in components such as retroreflectors and/or phase retardation plates that produce undesired ellipticities and undesired rotations of planes of polarization in beams in the interferometer. For a general reference on the theoretical causes of cyclic errors, see, for example, C. W. Wu and R. D. Deslattes, "Analytical modelling of the periodic nonlinearity in heterodyne interferometry," *Applied Optics*, 37, 6696–6700, 1998.

One example of a sub-harmonic cyclic error is generated when the measurement object mirror is parallel to the conjugate image of the reference mirror and, for a typical wavelength, leads to an error in the distance measured with an amplitude between 2.5 nm and approximately 5 nm depending on the amount of relative beam shear between the reference and measurement beams at a detector. The amplitude of one of the harmonic cyclic errors so generated is 0.25 nm to approximately 0.5 nm in a double pass plane mirror interferometer depending on the amount of relative beam shear. The sub-harmonic cyclic error can be eliminated by orienting the interferometer such the condition for generation of the sub-harmonic error is not met such as described in commonly owned U.S. Provisional Application No. 60/314,490 [Z-337] filed Aug. 23, 2001 and entitled "Tilted Interferometer" by Henry A. Hill. However, the harmonic cyclic error cannot be eliminated by such a procedure and can present a problem in lithography applications requiring high precision of the order of 0.1 nm such as EUV lithography.

The interferometers described above are often crucial components of scanner systems and stepper systems used in lithography to produce integrated circuits on semiconductor wafers. Such lithography systems typically include a translatable stage to support and fix the wafer, focusing optics used to direct a radiation beam onto the wafer, a scanner or stepper system for translating the stage relative to the exposure beam, and one or more interferometers. Each interferometer directs a measurement beam to, and receives a reflected measurement beam from, a plane mirror attached to the stage. Each interferometer interferes its reflected measurement beams with a corresponding reference beam, and collectively the interferometers accurately measure changes in the position of the stage relative to the radiation beam. The interferometers enable the lithography system to precisely control which regions of the wafer are exposed to the radiation beam.

In many lithography systems and other applications, the measurement object includes one or more plane mirrors to reflect the measurement beam from each interferometer. Small changes in the angular orientation of the measurement object, e.g., pitch and yaw of a stage, can alter the direction of each measurement beam reflected from the plane mirrors. If left uncompensated, the altered measurement beams reduce the overlap of the exit measurement and reference beams in each corresponding interferometer. Furthermore, these exit measurement and reference beams will not be propagating parallel to one another nor will their wave fronts be aligned when forming the mixed beam. As a result, the interference between the exit measurement and reference beams will vary across the transverse profile of the mixed beam, thereby corrupting the interference information encoded in the optical intensity measured by the detector.

To address this problem, many conventional interferometers include a retroreflector that redirects the measurement beam back to the plane mirror so that the measurement beam "double passes" the path between the interferometer and the measurement object. The presence of the retroreflector insures that the direction of the exit measurement is insensitive to changes in the angular orientation of the measurement object. When implemented in a plane mirror interferometer, the configuration results in what is commonly referred to as a high-stability plane mirror interferometer (HSPMI). Retroreflectors are also useful in systems employing other interferometer configurations.

One type of retroreflector used in such systems is a cube corner retroreflector. Such a retroreflector contains three mutually perpendicular surfaces which together reflect light along an output path that is anti-parallel to the input path. A light beam may first hit any one of the three surfaces over a large range of angles and is subsequently reflected towards the second and third surfaces, leaving in the reversed direction with a lateral displacement. The three surfaces can be part of a solid cube corner where the light hits the surface from inside a solid material with air on the other side, or they can be part of a hollow cube corner hitting the surface of a material from air. The hollow cube corner may have loss associated with the reflecting surfaces. A solid cube corner can use total internal reflection at the three surfaces to reduce reflection losses, but may introduce loss or back-scattering at its input face due to an imperfect anti-reflection coating. In general, the polarization state of a beam is changed upon exiting the cube corner retroreflector. The two main effects are rotation of the polarization and ellipticity. Both effects can cause beam mixing, resulting in cyclic errors. The polarization can can also be affected by reflection losses. As described in an article by N. Bobroff entitled "Recent Advances In Displacement Measuring Interferometry, "Measurement Science & Technology," 4(9), pp 907–926 (1993), a solid cube corner retroreflector coated with silver, common in commercial interferometers, rotates the polarization by 0.1 rad. Such a rotation is a source a sub-harmonic and harmonic cyclic errors in a double pass plane mirror heterodyne interferometer.

In practice, the interferometry systems are used to measure the position of the wafer stage along multiple measurement axes. For example, defining a Cartesian coordinate system in which the wafer stage lies in the x-y plane, measurements are typically made of the x and y positions of the stage as well as the angular orientation of the stage with respect to the z axis, as the wafer stage is translated along the x-y plane. Furthermore, it may be desirable to also monitor tilts of the wafer stage out of the x-y plane. For example, accurate characterization of such tilts may be necessary to calculate Abbe offset errors in the x and y positions. Thus, depending on the desired application, there may be up to five degrees of freedom to be measured. Moreover, in some applications, it is desirable to also monitor the position of the stage with respect to the z-axis, resulting in a sixth degree of freedom.

To measure each degree of freedom, an interferometer is used to monitor distance changes along a corresponding metrology axis. For example, in systems that measure the x and y positions of the stage as well as the angular orientation of the stage with respect to the x, y, and z axes, at least three spatially separated measurement beams reflect from one side of the wafer stage and at least two spatially separated measurement beams reflect from another side of the wafer stage. See, e.g., U.S. Pat. No. 5,801,832 entitled "Method of and Device for Repetitively Imaging a Mask Pattern on a Substrate Using Five Measuring Axes," the contents of which are incorporated herein by reference. Each measurement beam is recombined with a reference beam to monitor optical path length changes along the corresponding metrology axes. Because the different measurement beams contact the wafer stage at different locations, the angular orientation of the wafer stage can then be derived from appropriate combinations of the optical path length measurements. Accordingly, for each degree of freedom to be monitored, the system includes at least one measurement beam that contacts the wafer stage. Furthermore, as described above, each measurement beam may double-pass the wafer stage to prevent changes in the angular orientation of the wafer stage from corrupting the interferometric signal. The measurement beams may generated from physically separate interferometers or from multi-axes interferometers that generate multiple measurement beams.

SUMMARY

The invention features a retroreflector coating for use in an interferometer (e.g., a heterodyne interferometer), such as what may be used to measure the relative position and/or angular orientation of components in a microlithography system. The coating, when applied to the reflecting surfaces of a cube corner retroreflector, can be used to preserve the linear polarization state of light upon exiting the retroreflector. The coating is characterized by a relative phase retardation $\epsilon$ between the p and s components of a beam reflected by each of the surfaces of the coated cube corner. These polarization preserving properties are also insensitive to first order to a change in the relative phase retardation $\epsilon$ between the p and s components of a beam reflected by each of the surfaces of the coated cube corner.

We now summarize various aspects and features of the invention.

In general, in one aspect, the invention features an apparatus including: a corner cube retroreflector including three mutual perpendicular reflecting surfaces, the corner cube retroreflector defining a body diagonal; and a coating at each of the reflecting surfaces, the coating including at least one layer. For each of the reflecting surfaces, the coating causes a relative phase retardation $\epsilon$, defined by the phase angle in radians between p and s reflection coefficients at the reflecting surface, to be substantially equal to $\pi$ with respect to a plane of incidence including a normal to the reflecting surface and the body diagonal. For example, for each of the reflecting surfaces, the coating may cause the relative phase retardation $\epsilon$ to be equal to $\pi$ within 10%, to be equal to $\pi$ within 5%, or even to be equal to $\pi$ within 2%.

In general, in another aspect, the invention features an apparatus including: a corner cube retroreflector including three mutual perpendicular reflecting surfaces, the corner cube retroreflector defining a body diagonal; and a coating at each of the reflecting surfaces, the coating including at least one layer. The coating on each of the reflecting surfaces causes the corner cube retroreflector to have polarization eigenstates that are substantially linear.

Examples of either apparatus may include any of the following features.

The coating at each of the reflecting surfaces may include multiple layers. The multiple layers may include alternating high-refractive index and low-refractive index layers. For example, the multiple layers may include at least one ZnS layer and/or at least one $MgF_2$ layer. In another example, the multiple layers may include at least one $Ta_2O_5$ layer and/or at least one $HfF_4$ layer.

The corner cube retroreflector may be a solid corner cube retroreflector.

The corner cube retroreflector may be a hollow corner cube retroreflector.

The coating may further causes $\partial\epsilon/\partial\theta=0$ for some incident angle $\theta$ between 54.0 degrees and 55.5 degrees.

The coating may further causes $\partial\epsilon/\partial D \leq 10$ for some incident angle $\theta$ between 54.0 degrees and 55.5 degrees, where D is an optical thickness of one of the coating layers.

In another aspect, the invention features an interferometry system including: an interferometer including either apparatus described above. For example, the interferometer may be any of a high-stability plane mirror interferometer, a differential plane mirror interferometer, a Michelson interferometer, a dispersion interferometer, and a multi-axis interferometer.

In another aspect, the invention features a lithography system for use in fabricating integrated circuits on a wafer. The lithography system includes: a stage for supporting the wafer; an illumination system for imaging spatially patterned radiation onto the wafer; a positioning system for adjusting the position of the stage relative to the imaged radiation; and the interferometry system described above for monitoring the position of the wafer relative to the imaged radiation.

In another aspect, the invention features a lithography system for use in fabricating integrated circuits on a wafer. The system includes: a stage for supporting the wafer; and an illumination system including a radiation source, a mask, a positioning system, a lens assembly, and the interferometry system described above. During operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

In another aspect, the invention features a beam writing system for use in fabricating a lithography mask. The system includes: a source providing a write beam to pattern a substrate; a stage supporting the substrate; a beam directing assembly for delivering the write beam to the substrate; a positioning system for positioning the stage and beam directing assembly relative one another; and the interferometry system described above for monitoring the position of the stage relative to the beam directing assembly.

As used herein, any value specified for a phase (e.g., a phase retardation value, phase angle value, etc.) is expressed modulo $2\pi$ radians. For example, the phase value for any of $-\pi$, $\pi$, and $3\pi$(in radians) is expressed herein as being equal to a phase value of $\pi$ (in radians).

Unless otherwise defined, all technical and scientific terms used herein have the same meaning as commonly understood by one of ordinary skill in the art to which this invention belongs. In case of conflict with publications, patent applications, patents, and other references mentioned or incorporated herein by reference, the present specification, including definitions, will control.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

A retroreflector can be used to reverse the direction of propagation of a light beam over a wide range of incidence angles. When a retroreflector is used in an interferometer this can be a useful property to increase the stability of the light paths. One type of retroreflector is cube corner retroreflector which uses three mutually perpendicular surfaces which together reverse the direction of propagation. A light beam may first hit any one of the three surfaces over a large range of angles and is subsequently reflected towards the second and third surfaces, the light beam leaving the retroreflector travelling in the opposite direction and parallel to its incoming path. There is also a lateral displacement associated with the three reflections which depends on what part of the first reflecting surface the beam hits. The three surfaces can be part of a solid cube corner where the light hits the surface from inside a solid material with air on the other side, or they can be part of a hollow cube corner hitting the surface of a reflecting material from air. In general, the polarization state of a beam is changed upon exiting a cube corner retroreflector. For an incoming beam that is linearly polarized there are two main polarization effects that may occur. The linear polarization can become elliptical, and the linear polarization or the axes of the ellipse can be rotated. Both effects can cause beam mixing, resulting in cyclic errors. One cause of these effects is the relative phase retardation acquired upon reflection from each of the three surfaces. Polarized light reflecting from the surface of a dielectric material at non-normal incidence will, in general, experience a relative phase retardation between the components of the field parallel to the plane of incidence, the p component, and perpendicular to the plane of incidence, the s component. This relative phase retardation is a property of the materials on either side of the reflecting surface and depends on an angle of incidence (which defines a plane of incidence). A way to describe this relative phase retardation is in terms of the p and s reflection coefficients $\Gamma^p$ and $\Gamma^s$. These coefficients are complex numbers whose angles represent the phase shift imparted to the p and s components of a beam upon reflection. The relative phase retardation is the angle between these two complex numbers. A relative phase retardation that is an integer multiple of $\pi$ can produce a rotation of the polarization, but the polarization will remain linear. Other values of the relative phase retardation can produce ellipticities.

Figure 1:
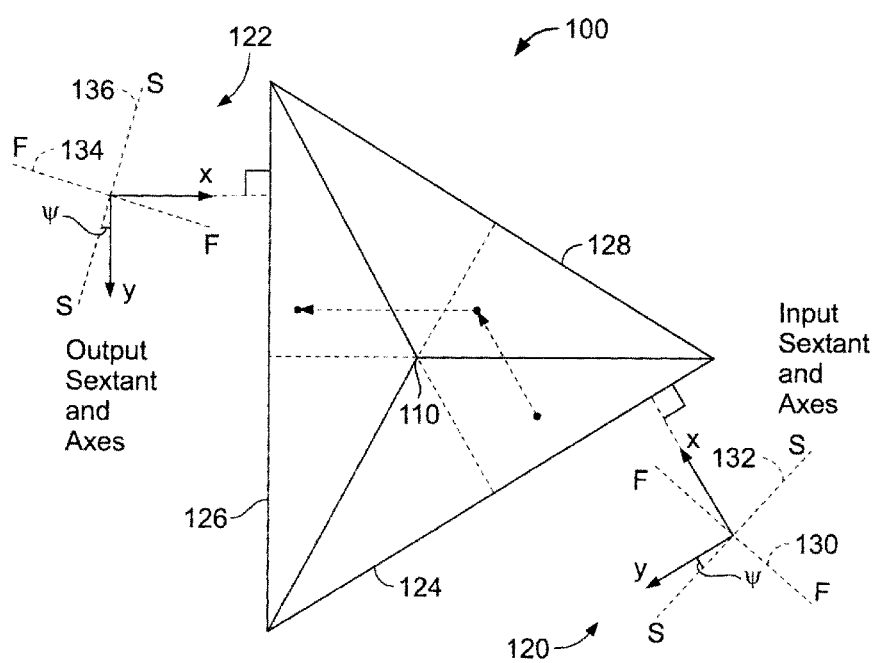
FIG. 1 is a view of a cube corner retroreflector with an indication of the light path at the reflecting surfaces, showing the input and output reference polarization axes along with the fast and slow axes.

Now that we have discussed some general properties of retroreflectors, we will analyze the properties of a retroreflector 100 illustrated in FIG. 1, where light is incident parallel to a cube body-diagonal 110 passing through the corner (normal to the page). This is known as "normal incidence" and has the property that light is incident at the same angle to all three surfaces of the cube corner retroreflector. Therefore, if the same materials make up the three surfaces, each surface will have the same relative phase retardation $\epsilon$. For each surface, the plane of incidence which defines the the p and s reflection coefficients includes the surface normal and the cube body-diagonal 110.

FIG. 1 indicates a typical light-path through the cube corner retroreflector, together with the x and y axes to which the polarization states of input and output beams are referred. This view is along the body-diagonal of the cube 110, with the corner toward the viewer. The input polarization axes 120 and the output polarization axes 122 are referenced to the input surface 124 and the output surface 126, respectively. Both the input 120 and output 122 axes are right-handed with their z-axes (not shown) along the respective directions of propagation. In the case shown, the input beam is incident (towards the viewer) first on the surface shown lower right 124, and is reflected in turn to the surface shown upper right 128 and to the surface shown left 126, before re-emerging from the cube corner retroreflector to travel away from the viewer, along the output z-axis. The sequence of faces depends on the sextant into which the light is incident.

The separate input and output polarization axes 120 and 122 are used to facilitate the description of the effects on the polarization state of an incoming light beam due to all three reflections in a lossless cube corner retroreflector. The polarization state can be described in terms of the Jones matrix formalism where the input polarization state is given by a vector $$\begin{bmatrix} x_{in} \\ y_{in} \end{bmatrix}$$

with respect to the input axes 120 and the output polarization state is given by a vector $$\begin{bmatrix} x_{out} \\ y_{out} \end{bmatrix}$$

with respect to the output axes 122. These vectors are related by multiplication by a 2×2 Jones matrix M:

$$\begin{bmatrix} x_{out} \\ y_{out} \end{bmatrix} = M \begin{bmatrix} x_{in} \\ y_{in} \end{bmatrix} \tag{1}$$

Using these separate input and output polarization axes 120 and 122, the Jones matrix M, representing the effects of the cube corner retroreflector on the polarization state of a beam, can be decomposed into the product of three matrices:

$$M = \text{Rot}(-\psi)\text{Ret}(\delta)\text{Rot}(\psi). \tag{2}$$

The matrix Rot($\psi$) represents a rotation of the polarization axes by an azimuth angle $\psi$, and the matrix Ret($\delta$) represents a relative phase retardation of $\delta$ applied to the component along the slow axis relative to the component along the fast axis:

$$Rot(\psi) = \begin{pmatrix} \cos\psi & \sin\psi \\ -\sin\psi & \cos\psi \end{pmatrix}, \tag{3}$$

$$Ret(\delta) = \begin{pmatrix} \exp(j\delta/2) & 0 \\ 0 & \exp(-j\delta/2) \end{pmatrix}, \tag{4}$$

where $j=\sqrt{-1}$. This Ret($\delta$) matrix has linear eigenstates represented by a set of orthogonal fast and slow axes. The polarization state of light polarized along either of these axes is unchanged by Ret($\delta$). The orientation of these fast and slow axes is shown in FIG. 1 with respect to both of the polarization spaces represented by the input axes 120 and the output axes 122. So light linearly polarized along the input fast axis 130 will exit linearly polarized along the output fast axis 134. Similarly, light linearly polarized along the input slow axis 132 will exit linearly polarized along the output slow axis 136. The angle $\delta$ gives the value of the relative phase retardation due to the combined effect of all three reflecting surfaces of the cube corner retroreflector.

The effective relative phase retardation $\delta$ and azimuth $\psi$ for a cube corner expressed in terms of the relative phase retardation $\epsilon$ at each reflection are given by:

$$\cos\left(\frac{\delta}{2}\right) = (1/4)\cos(3\epsilon/2) + (3/4)\cos(\epsilon/2), \tag{5}$$

$$\tan(2\psi) = \frac{2\sqrt{3}\sin(\varepsilon/2)}{\sin(3\varepsilon/2) + 3\sin(\varepsilon/2)}. \tag{6}$$

(See article by M. A. Player entitled "Polarization Properties Of A Cube-Corner Reflector," Journal of Modern Optics, 35(11) pp 1813–1820.) Equations (5) and (6) assume a lossless cube corner with a relative phase retardation $\epsilon$ at each surface, which could apply, for example, to a solid cube corner retroreflector or a hollow cube corner retroreflector.

In general, the polarization eigenstates of the cube corner retroreflector (states that remain unchanged by passage through the cube corner retroreflector) are elliptical. This is undesirable in the context of an interferometer since it can lead to beam mixing. However, for the case of $\epsilon=\pi$, the corner cube retroreflector has polarizaiton eigenstates that are substantially linear, as described in greater detail below.

For this case ($\epsilon=\pi$) the values for the effective relative phase retardation $\delta$ and azimuth $\psi$ are $\pi$ and $\pi/6$, respectively. For an azimuth $\psi=\pi/6$, the input fast axis 130 and the output fast axis 134 are parallel, and the input slow axis 132 and the output slow axis 136 are parallel. (This can be seen by examining FIG. 1 and noting that the angle between the input and output polarization axes is $\pi/3$.) For this case of $\epsilon=\pi$, the eigenstates of the cube corner retroreflector become linear. Since the relative phase retardation between the associated fast and slow axes is $\delta=\pi$ this means that a cube corner retroreflector for which $\epsilon=\pi$ has the properties of a half-wave phase retardation plate. This is important because it allows the cube corner retroreflector to be used in a way that preserves the linear polarization state of a light beam (no induced ellipticity or rotation). This leads to profound benefits when such a cube corner retroreflector is used in an interferometer.

Another advantage of setting $\epsilon$ equal to $\pi$ is that the properties which lead to linear eigenstates are robust, allowing the relative phase retardation $\epsilon$ to vary from strict equality to $\pi$ while still preserving the benefits expained above. This can be shown by analyzing Equations (5) and (6) for values of $\epsilon$ near $\pi$ ($\epsilon \approx \pi$). A power series expansion around $\epsilon=\pi$ can be used to examine the dependence of $\delta$ and $\psi$ on $\epsilon$ for $\epsilon \approx \pi$. We first find the values of derivatives of the relative phase retardation $\delta$ and the azimuth $\psi$ evaluated at $\epsilon=\pi$:

$d\delta/d\epsilon=0$, $d^2\delta/d\epsilon^2=0$, \qquad (7)

$d\psi/d\epsilon=0$. \qquad (8)

Using these derivatives, we calculate the two leading (non-zero) terms of the power series representation of $\delta$ and $\psi$ around $\epsilon=\pi$, valid for $\epsilon \approx \pi$:

$$\delta = \pi + \frac{1}{4}(\varepsilon - \pi)^3, \tag{9}$$

$$\psi = \frac{\pi}{6} - \frac{\sqrt{3}}{16}(\varepsilon - \pi)^2. \tag{10}$$

Figure 2:
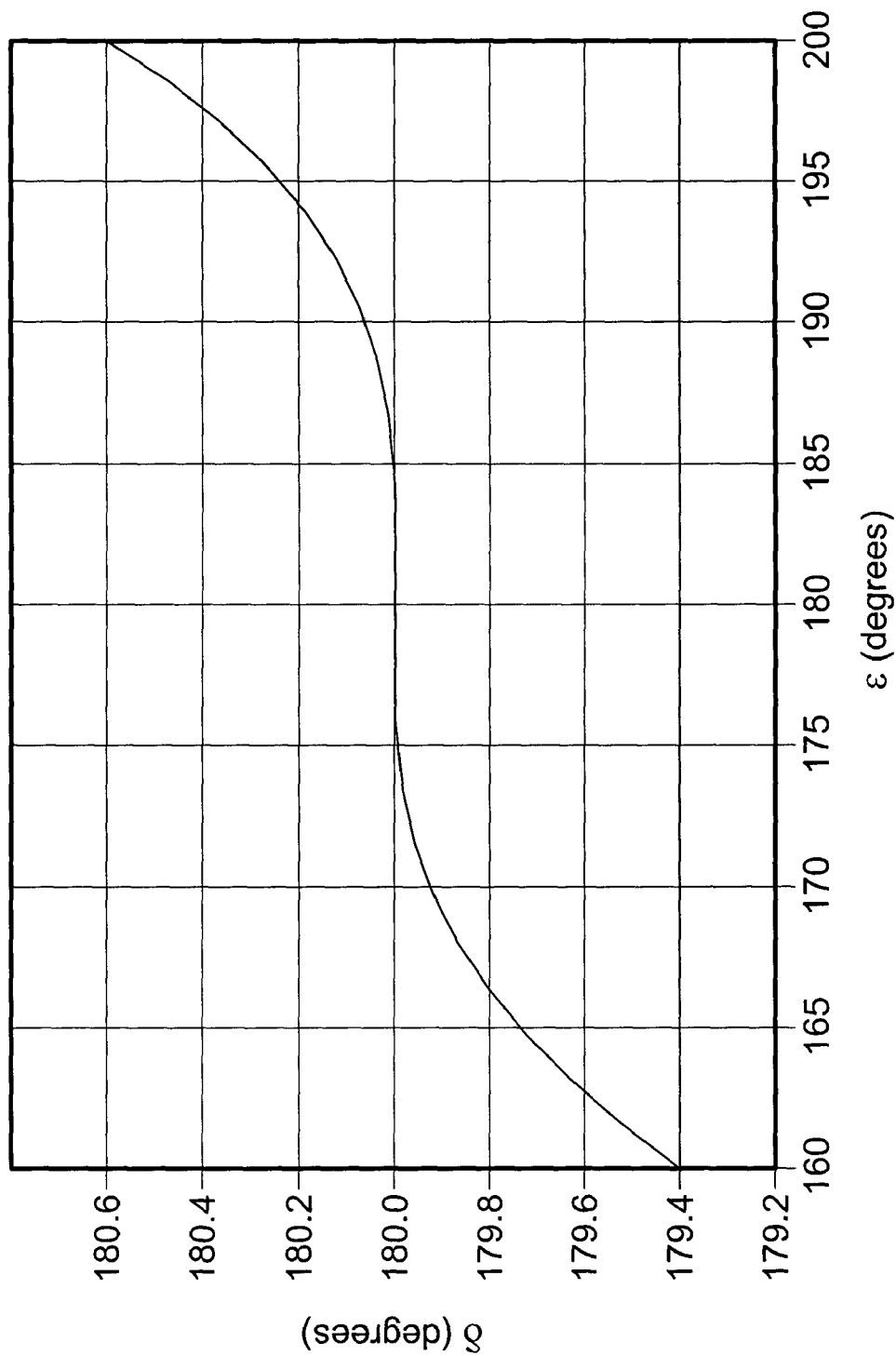
FIG. 2 is a plot of the relative phase retardation $\delta$ (in degrees) of a cube corner as a function of the relative phase retardation $\epsilon$ (in degrees) of a single surface.
Figure 3:
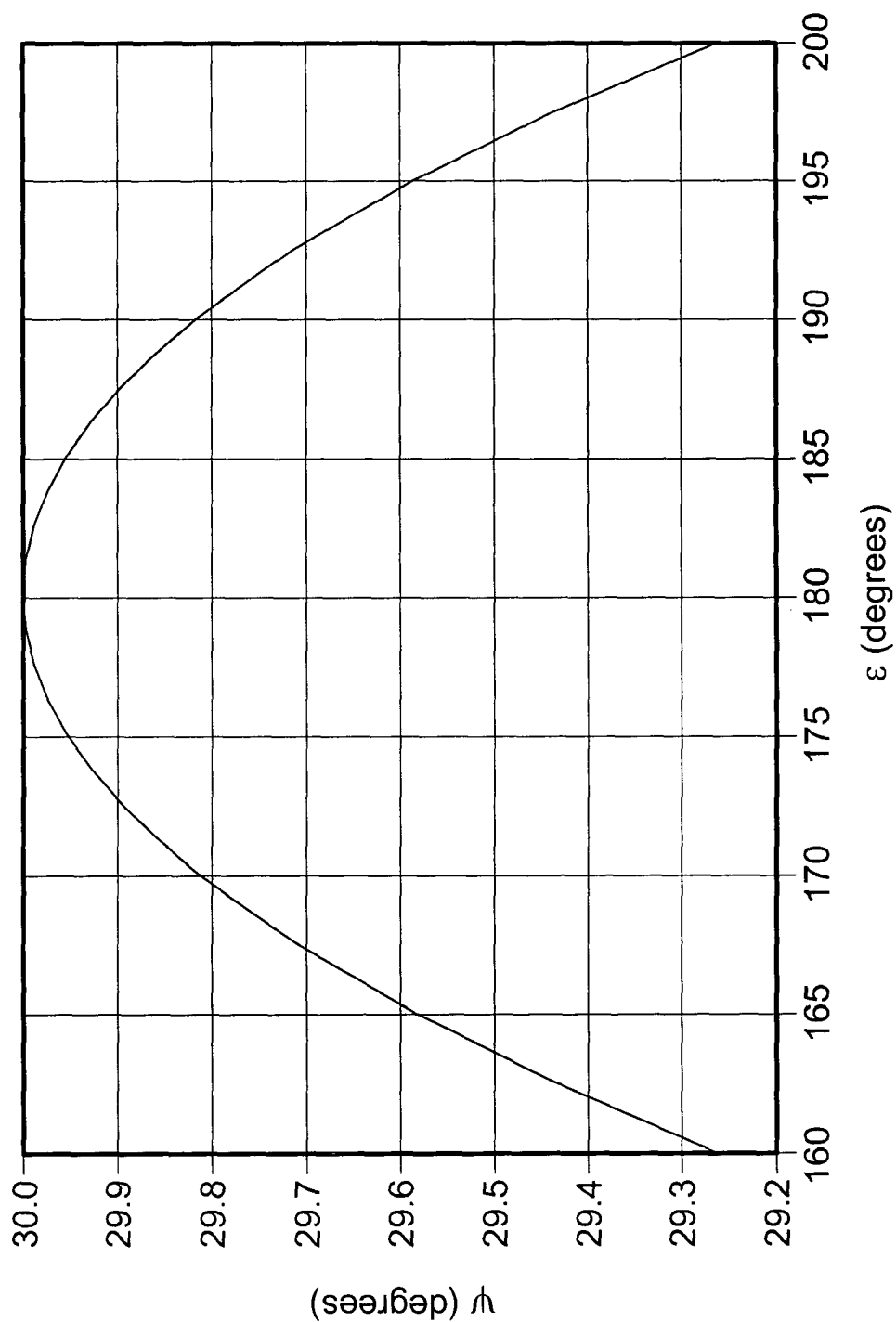
FIG. 3 is a plot of the azimuth angle $\psi$ (in degrees) as a function of the relative phase retardation $\epsilon$ (in degrees) of a single surface.

The dependence of $\delta$ on $(\epsilon-\pi)^3$ and the dependence of $\psi$ on $(\epsilon-\pi)^2$ as exhibited in FIGS. 2 and 3 illustrate an advantage of setting $\epsilon$ substantially equal to $\pi$. Because the expansion of $\psi$ has no first order term and the expansion of $\delta$ has no first or second order terms, the values of $\psi$ and $\delta$ change slowly with an increase in $|\epsilon-\pi|$. We use this dependence to obtain a cube corner retroreflector whose properties have reduced sensitivities to changes in the relative phase retardation at the reflecting surfaces of the cube corner retroreflector.

Accordingly, the benefits of designing the retroreflector to have $\epsilon$ equal to $\pi$ are maintained even if $\epsilon$ is not identically equal to $\pi$. Therefore, as used herein, when we say that $\epsilon$ is equal to $\pi$, or $\epsilon$ is substantially equal to $\pi$, we do not mean that $\epsilon$ is identically equal to $\pi$, rather we mean that $\epsilon$ is sufficiently close to $\pi$ to provide benefits such as those disclosed herein (e.g., substantially linear polarization eigenstates for the retroreflector, and a reduction in polarization rotation and/or ellipticity and corresponding cyclic errors caused by the retroreflector when it is optimally positioned in an interferometer). For example, we consider values of $\epsilon$ that are substantially equal to $\pi$ to include values of $\epsilon$ that are within 2% of $\pi$, within 5% of $\pi$, or even within 10% of $\pi$.

To implement a cube corner retroreflector with a relative phase retardation of $\epsilon \approx \pi$ at each surface, we propose using a coating, such as a multi-layer dielectric coating, applied on the reflecting surfaces of a solid cube corner retroreflector. We describe a method to design such a multi-layer dielectric coating. Following standard methods for designing multi-layer dielectric coatings, such as those for high-reflection or anti-reflection coatings, alternating quarter-wave-thick layers of high-refractive index and low-refractive index materials are applied to a substrate. For quarter-wave-thick layers, each pair of high and low index layers multiplies the wave impedance by a number determined by the ratio of the indices. In this manner two media with different refractive indices (one usually being air with an index of one) can be impedance matched by an anti-reflection coating with the appropriate number of layers between them. Or, for a high-reflection coating a large number of layers can be used to make the effective wave impedance very large. In some embodiments of the present invention one may use alternating layers of high and low index material deposited onto the cube corner surfaces. However, unlike a high-reflection or an anti-reflection coating, such layers need not be designed to have quarter-wave thickness, but are instead designed to achieve a relative phase retardation $\epsilon \approx \pi$. Another design objective may be to use total internal reflection to reduce losses associated with the retroreflector.

Given such design objectives, what follows will be a detailed description of a procedure that may be used to design a coating achieving those objectives. First we consider the relative phase retardation at a reflecting surface of a solid cube corner retroreflector without a coating. Since we are considering "normal incidence" the angle of incidence $\theta_0$ is the same for all three reflections in the cube corner and can be calculated from the angle between the body-diagonal 110 and the closest line on an adjacent surface:

$\theta_0 = a\sin\sqrt{(\frac{2}{3})} = 0.9553$ radians $= 54.74$ degrees. \qquad (11)

For an uncoated solid cube corner retroreflector this angle is well beyond the critical angle for most types of glass materials. For an angle of incidence beyond the critical angle an incoming beam will undergo total internal reflection with an associated relative phase retardation. For example, for this angle of $\theta_0$, the relative phase retardation is approximately $\epsilon=2.36$ radians for a material with an index of 1.5, well short of our design criterion.

Figure 4:
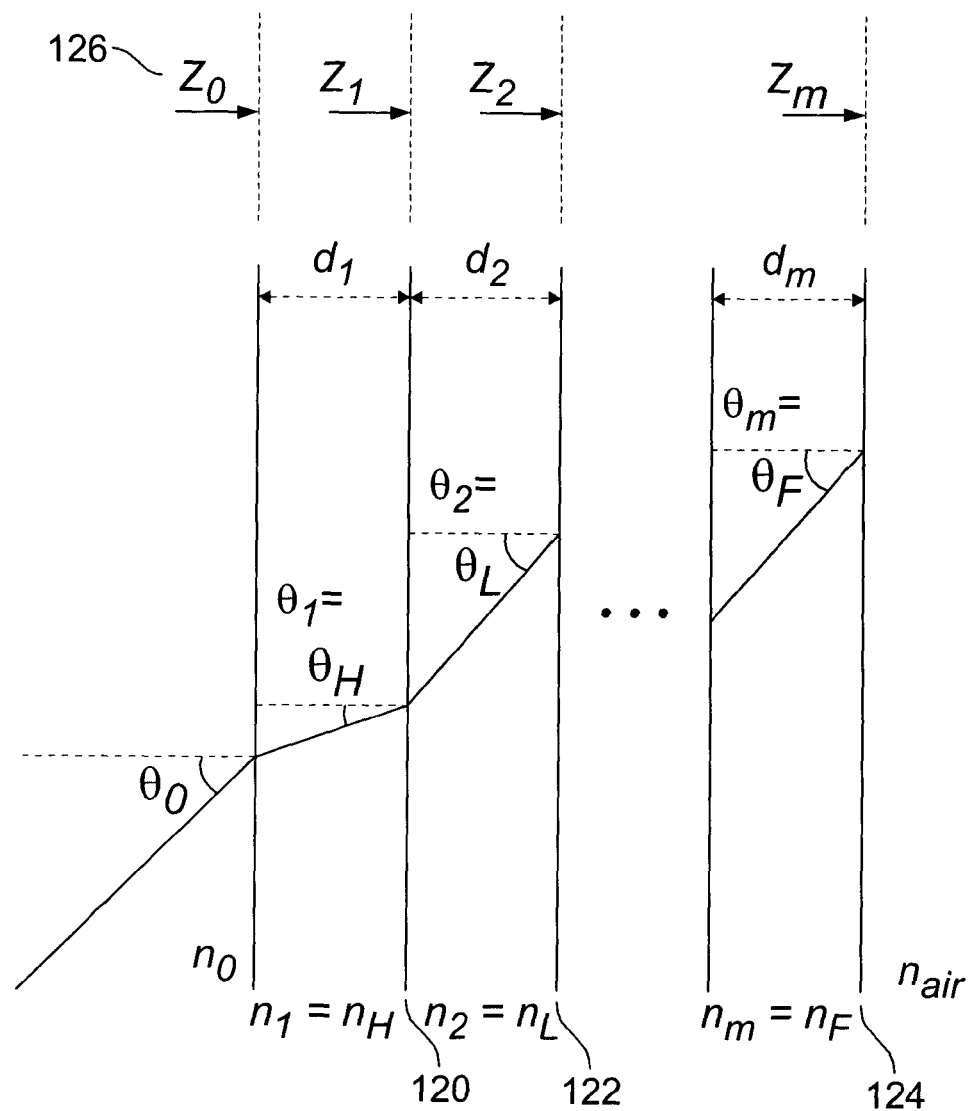
FIG. 4 shows the angles of a light path in the plane of incidence at the interfaces of a multi-layer coating.

We will now consider adding alternating layers of materials with a high index $n_H$, and a low index $n_L$ to the reflecting surfaces of a solid cube corner retroreflector made of a dielectric material with an index of $n_0$. FIG. 4 shows m layers where layer i has thickness $d_i$, index $n_i$, and normalized wave impedances $Z_i$. This configuration helps to limit our design parameters, making the search for solutions more tractable. However, other configurations are also possible and within the scope of the invention, such as using more than two types of materials for the different layers.

In achieving our design objective to use total internal reflection, care should be taken in choosing the materials to ensure that the critical angle is exceeded only at the last interface (of either coating material with air), otherwise subsequent layers will have minimal effect, if any. As shown in FIG. 4, for a coating with alternating layers of material with indices $n_H$ and $n_L$, there are only three values for the angles of incidence that occur. $\theta_0$ has the same value regardless of the coatings used. $\theta_H$ is the angle of incidence at the first high/low (H/L) interface 120 and is determined by Snell's law: $n_0 \sin(\theta_0) = n_H \sin(\theta_H)$. $\theta_L$ is the angle made at the first low/high (L/H) interface 122 and is also determined by Snell's law: $n_H \sin(\theta_H) = n_L \sin(\theta_L)$. All of the other angles alternate between $\theta_H$ and $\theta_L$ where the angle $\theta_F$ at the final (F) interface 124 with the outside medium (typically air) is equal to either $\theta_L$ or $\theta_H$ depending on whether an even or odd number of layers is used. For the critical angle to be exceeded only at the final interface the following conditions hold:

$$\theta_H < \arcsin\left(\frac{n_L}{n_H}\right), \tag{12}$$

$$\theta_F > \arcsin\left(\frac{n_{air}}{n_F}\right). \tag{13}$$

The design process may then proceed by choosing thicknesses $d_i$ of the layers and the number of layers m such that the input impedance 126 of the coating has different values for the p and s polarizations, $Z_0^p$ and $Z_0^s$, leading to a $\epsilon \approx \pi$ relative phase retardation. The value of the relative phase retardation $\epsilon$ between the p and s reflection coefficients, $\Gamma^6$ and $\Gamma^s$, is given by:

$$\epsilon = \arg(\Gamma^s/\Gamma^p) \tag{14}$$

where the reflection coefficients can be calculated from the normalized wave impedances:

$$\Gamma^p = \frac{Z_0^p - 1}{Z_0^p + 1}, \tag{15}$$

$$\Gamma^s = \frac{Z_0^s - 1}{Z_0^s + 1}. \tag{16}$$

The normalized wave impedances at the air interface for the p and s polarizations are given by:

$$Z_m^p = -j\frac{n_F\sqrt{\left(\frac{n_F}{n_{air}}\sin\theta_F\right)^2 - 1}}{n_{air}\cos\theta_F}, \tag{17}$$

$$Z_m^s = j\frac{n_F\cos\theta_F}{n_{air}\sqrt{\left(\frac{n_F}{n_{air}}\sin\theta_F\right)^2 - 1}}. \tag{18}$$

The normalized wave impedances $Z_i$ at the interfaces of the various layers can then be calculated iteratively for i= m−1, ..., 0 as follows:

$$Z_{i-1}^p = \left(\frac{n_{i-1}\cos\theta_i}{n_i\cos\theta_{i-1}}\right)\frac{Z_i^p - j\tan(2\pi D_i\cos\theta_i)}{1 - jZ_i^p\tan(2\pi D_i\cos\theta_i)}, \tag{19}$$

$$Z_{i-1}^s = \left(\frac{n_{i-1}\cos\theta_{i-1}}{n_i\cos\theta_i}\right)\frac{Z_i^s - j\tan(2\pi D_i\cos\theta_i)}{1 - jZ_i^s\tan(2\pi D_i\cos\theta_i)}, \tag{20}$$

where the optical thicknesses $D_i$ are related to the physical thicknesses $d_i$ by $D_i = d_i n_i/\lambda$. The various optical thicknesses $D_i$ and the number of layers m can be varied to search for values which yield $\epsilon \approx \pi$.

We will now present two example coating designs. The following example designs were obtained by searching for values of $D_i$ near an initial value of 0.25 (quarter-wave layers for normal incidence), and adding layers as necessary. In particular, these examples demonstrate the advantages of the reduced sensitivity to changes in the relative phase retardation at the reflecting surfaces of the retroreflector. These include reduced sensitivity to errors in the optical thicknesses of layers of a coating that can be caused during manufacture of the coating, and reduced sensitivity to changes the optical properties of a coating as a function of time. The optical properties of a coating may change in time due to, for example, absorption of a gas and/or reaction with a gas from the cube corner environment or cube corner substrate. Another advantage is reduced sensitivity to changes in $\epsilon$ caused by small changes in the angles of incidence of the beams at the reflecting surfaces of the retroreflector. This makes the coated cube corner retroreflector less sensitive to alignment errors when used in an interferometry system. Two primary contributors to the errors in the value of $\epsilon$ away from the design value of $\pi$ are the errors in optical thicknesses of coating layers generated during manufacture of a coating and generated by changes in the properties of the coating with time, and the range in the angles of incidence of beams at the reflecting surfaces of the coated cube corner retroreflector in a given end use application. In preferred embodiments, the design of the coating can be optimized to further reduce sensitivity to changes in thicknesses of coating layers or angles of incidence by selecting parameters such that $\epsilon$ itself is insensitive to first order to such changes. An example coating is given below where $d\epsilon/d\theta = 0$ (at $\epsilon = \pi$) making it even less sensitive to changes in $\theta$, the angle of incidence at a reflecting surface of the cube corner. A second example coating is given where $d\epsilon/d\theta \neq 0$ (at $\epsilon = \pi$), but which has a reduced sensitivity, in both $\epsilon$ and $\psi$, to a change in the optical thickness of a layer of the coating. Despite this trade-off, coatings of both types remain advantageous because $\delta$ and $\psi$ are relatively insensitive to changes in $\epsilon$ (sensitive only to $3^{rd}$ and $2^{nd}$ order, respectively). The choice between which of these types of coatings may be optimal for a given end use application will depend in part on the range in angle of incidence that is present in the end use application and in part on uncertainty in $\epsilon$ associated with, for example, optical thicknesses of layers of a coating and changes in time of the optical properties of the coating.

TABLE 1

Coating Design 1

| Material | Refractive Index λ = 633 nm | Thickness, Optical |
|---|---|---|
| Sub-strate BK-7 | 1.5151 | |
| ZnS | 2.3139 | 0.148 |
| MgF$_2$ | 1.379 | 0.190 |
| ZnS | 2.3139 | 0.218 |
| MgF$_2$ | 1.379 | 0.032 |
| Air | 1 | |

Figure 5:
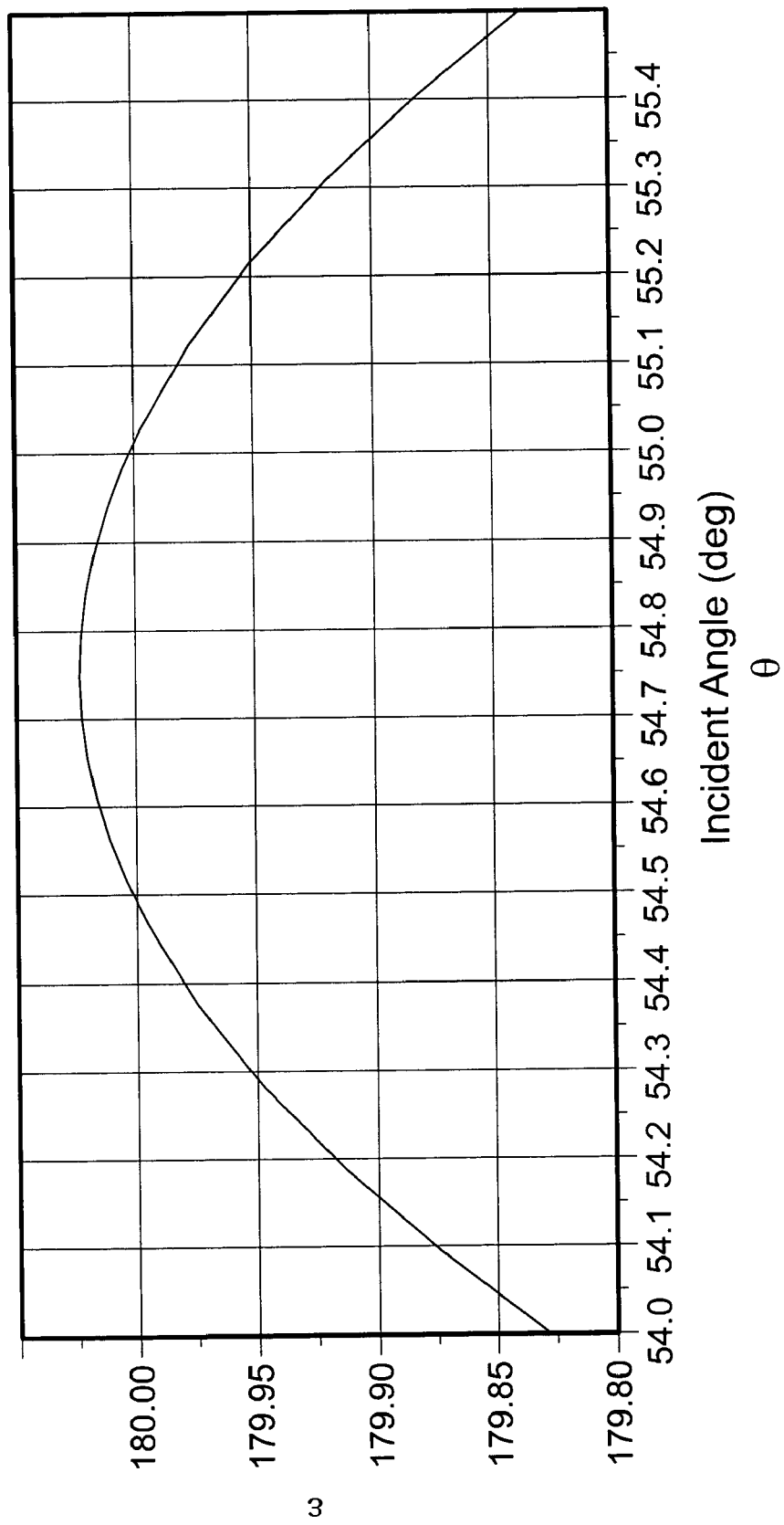
FIG. 5 is a plot of the relative phase retardation $\epsilon$ (in degrees) of a single surface as a function of incidence angle (in degrees) or design coating 1.

The first example design of a coating is listed in Table 1. The example coating uses a four layer dielectric stack on a BK-7 glass substrate. The relative phase retardation $\epsilon$ for the coating design at wavelength λ=633 nm is shown in FIG. 5 as function the angle of incidence θ between 54.0 and 55.5 degrees. Note that the relative phase retardation $\epsilon$ reaches a maximum value of 179.83 degrees at θ=54.75 degrees, indicating a value of $d\epsilon/d\theta=0$ at this location. This implies a reduced sensitivity to changes in $\epsilon$ due to changes in θ. For this design, the sensitivity to a change in optical thickness of a layer can be evaluated numerically. A change in the optical thickness of a layer of 0.001 causes a change in $$|\epsilon-\epsilon_0| \leq 0.019 \text{ radians} \tag{21}$$

where $\epsilon_0$ is the value of $\epsilon$ before the change in optical thickness of a layer. The corresponding change in $\psi$ relative to π/6 is $$\psi - \frac{\pi}{6} = -40 \text{ microradians} \tag{22}$$

These numbers can be compared to those of another design without the property $d\epsilon/d\theta=0$.

TABLE 2

Coating Design 2

| Material | Refractive Index λ = 633 nm | Thickness, Optical |
|---|---|---|
| Sub-strate BK-7 | 1.5151 | |
| Ta$_2$O$_5$ | 2.1334 | 0.253 |
| HfF$_4$ | 1.5667 | 0.258 |
| Ta$_2$O$_5$ | 2.1334 | 0.256 |
| Air | 1 | |

Figure 6:
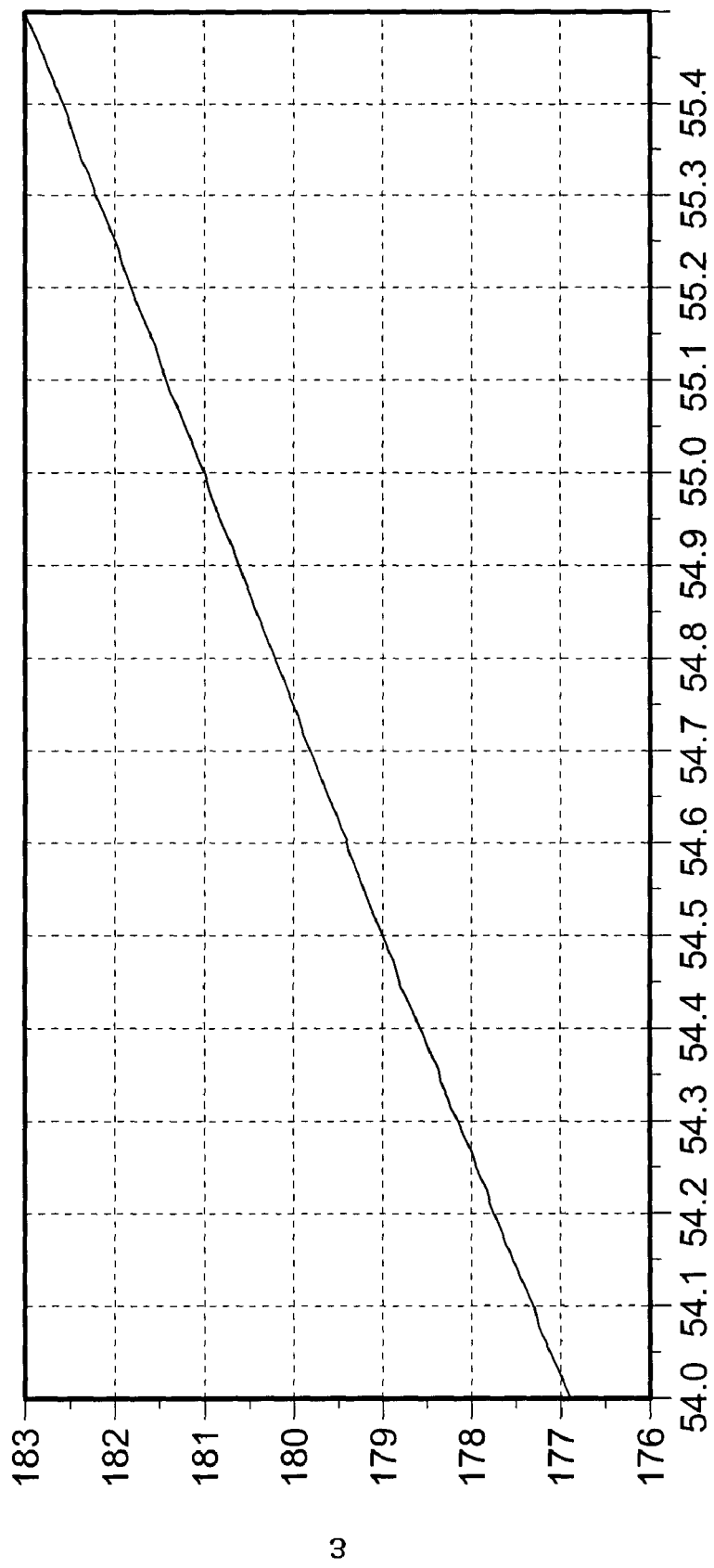
FIG. 6 is a plot of the relative phase retardation $\epsilon$ (in degrees) of a single surface as a function of incidence angle (in degrees) for design coating 1.

The second example design of a coating is listed in Table 2. The example coating uses a three layer dielectric stack on a BK-7 glass substrate. The relative phase retardation $\epsilon$ for the coating design at wavelength λ=633 nm is shown in FIG. 6 as function the angle of incidence θ between 54.0 and 55.5 degrees. Note that $d\epsilon/d\theta \neq 0$ at θ=54.75 degrees. A change in optical thickness of a layer in the second example of 0.001 causes a change in $\epsilon$ that is accordingly $$|\epsilon-\epsilon_0| \leq 0.0022 \text{ radians} \tag{23}$$

where $\epsilon_0$ is the value of $\epsilon$ at θ=54.75 before the change in optical thickness of a layer. The corresponding change in $\psi$ relative to π/6 is $$\psi - \frac{\pi}{6} = -0.51 \text{ microradians} \tag{24}$$

Here we see that the second design achieves a reduced sensitivity to a change in optical thickness of a layer, compared to the first design. Other coatings that give similar results may be chosen where the relative phase retardation $\epsilon$ is more or less sensitive to (θ−θ$_0$), with plus or minus slopes, and more or less sensitive to a variation in the optical thickness of the layers. Similar properties are obtained for other sub-strate materials, e.g., fused silica, by making adjustments in the optical thickness of the layers.

Corner cube retroreflectors with these types of coatings can be used in interferometry systems to preserve the linear polarization state of light upon exiting the retroflector. Since the inventive coated cube corner retroreflector has input fast and slow axes 130 and 132 that are parallel to the output fast and slow axes 134 and 136 as described above, a beam that is polarized along either the fast or slow axis will remain linearly polarized without experiencing any rotation. Therefore when the inventive coated cube corner retroreflector is placed into an interferometry system it can be aligned relative to the polarization axes of the interferometer. This prevents the beam mixing that may occur with typical silver coated cube corner retroreflectors which experience a retro-induced polarization rotation on the order of 0.1 radians.

Figure 7:
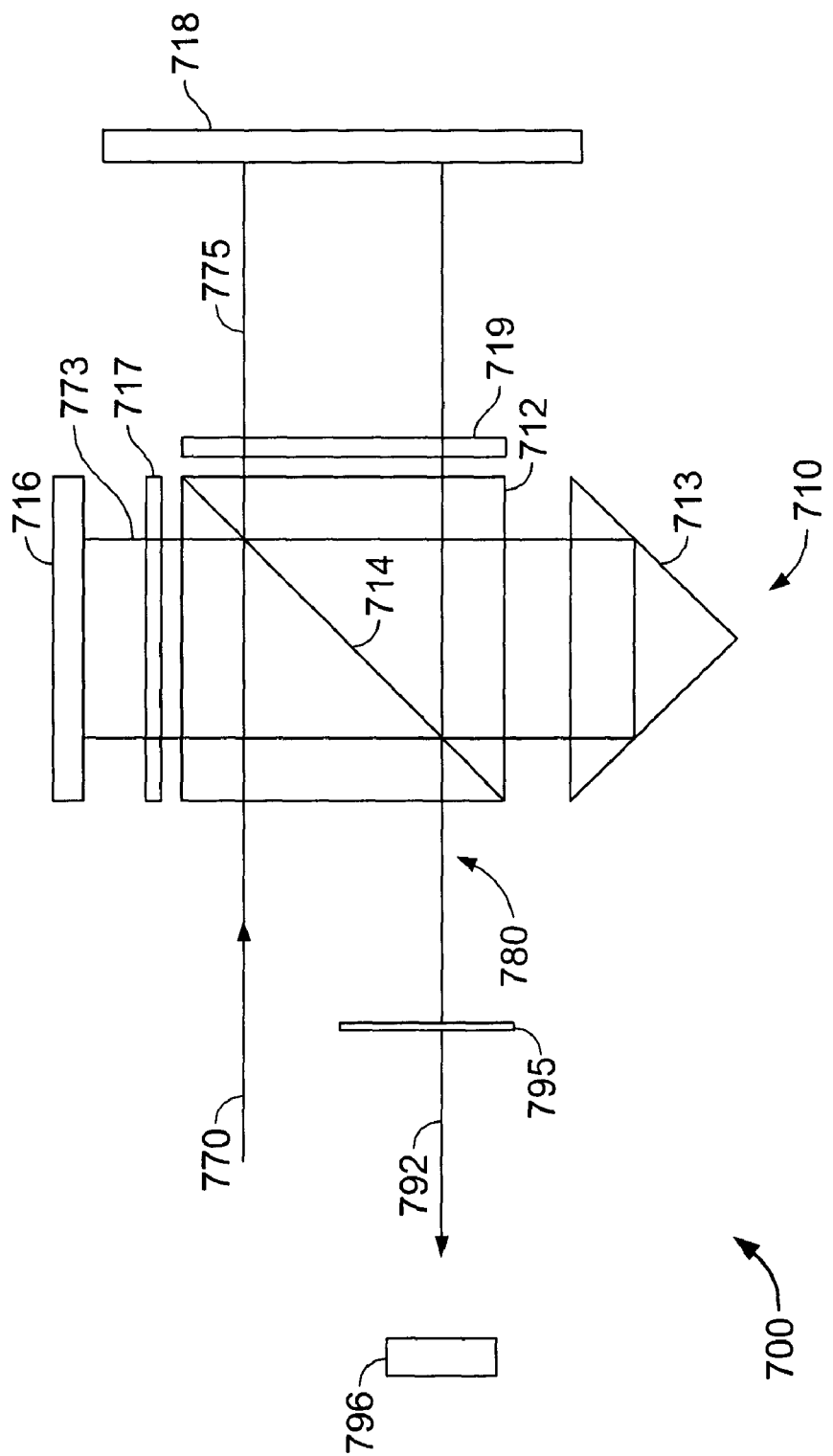
FIG. 7 shows an example interferometry system.

Referring to FIG. 7, we will now describe an interferometry system 700 that utilizes the inventive coated cube corner retroreflector 713 to suppresses non-linearities such as those caused by beam mixing. In this example the interferometry system 700 includes a high-stability plane mirror interferometer (HSPMI) 710 having a polarizing beam-splitting cube 712, a reference mirror 716, a reference quarter wave plate 717, a measurement mirror 718, and a measurement quarter wave plate 719. Beam splitting cube 712 includes a polarizing beam splitting interface 714. Measurement mirror 718 is typically connected to a measurement stage (not shown) that moves relative to the beam-splitting cube.

During operation, interferometer 710 receives an input beam 770 having orthogonally polarized components defining reference and measurement beam components. The reference beam component is linearly polarized out of the plane of the figure, and the measurement beam component is linearly polarized in the plane of the figure. The orthogonally polarized components further include a heterodyne frequency shift between them. Absent any imperfections in the interferometer, the reference and measurement beam components are spatially separated to define reference beam 773 and measurement beam 775, respectively, and directed along respective reference and measurement paths by polarizing beam-splitter interface 714.

Reference beam 773, which is initially reflected by interface 714, passes through quarter wave plate 717 and onto reference mirror 716, which reflects it back through quarter wave plate 717 to interface 714. Because of the double pass through quarter wave plate 717, the reference beam is then transmitted through interface 714 to retroreflector 713, which laterally translates the beam and reflects it back through interface 714 for a second pass to reference mirror 716. During this second pass, the reference beam again double passes quarter wave plate 717 so that upon being reflected a second time by the reference mirror back to interface 714, it is then reflected by interface 714 to form the reference beam component of output beam 780.

Measurement beam 775, which is initially transmitted by interface 714, passes through quarter wave plate 719 and onto measurement mirror 718, which reflects it back through quarter wave plate 719 to interface 714. Because of the double pass through quarter wave plate 719, the measurement beam is then reflected by interface 714 to retroreflector 713, which laterally translates the beam and reflects it back to interface 714, which reflects it for a second pass to measurement mirror 718. During this second pass, the measurement beam again double passes quarter wave plate 719 so that upon being reflected a second time by the measurement mirror back to interface 714, it is then transmitted by interface 714 to form the measurement beam component of output beam 780.

Interferometry system 700 further includes a polarizer 795 positioned to mix the orthogonal polarizations of the desired portions of compensated output beam 790 to produce signal beam 792, whose time-varying intensity is monitored by photo-detector 796. The intensity signal includes a heterodyne interference signal at the frequency shift between the reference and measurement beam components of input beam 770. The interference signal is indicative of changes in the optical path length difference between the reference and measurement paths, e.g., changes in the relative position of measurement mirror 718.

Imperfections in interferometer system 700 may cause output beam 780 to include spurious beam components in addition to the reference and measurement beam components of the output beam as described in the previous paragraphs. For example, retro-induced polarization rotation can occur in a silver coated cube corner retroreflector. Any rotation can cause a spurious portion of the reference beam component in input beam 770 to propagate along some or all of the measurement path as part of measurement beam 775 and a spurious portion of the measurement beam component of input beam 770 to propagate along some or all of the reference path as part of reference beam 773. The spurious beam components also propagate through polarizer 795 and onto photo-detector 796, causing beam mixing which leads to measurement non-linearities. The inventive coated cube corner retroreflector 713 can be used to prevent spurious beam components that would have been caused by such rotation. The inventive coated cube corner retroreflector 713 is also insensitive to errors or changes in coating properties, providing a robust solution to reduce undesirable measurement non-linearities.

In other examples of the interferometry system, the interferometer may be different from the high-stability plane mirror interferometer 710 shown in FIG. 7, for example, the interferometer may be a differential plane mirror interferometer, a Michelson interferometer, a dispersion interferometer using multiple wavelengths (e.g., harmonics such as 1064 nm and 532 nm) or an interferometer with a dynamic beam steering element (see, e.g., U.S. Pat. No. 6,252,667 and U.S. Pat. No. 6,313,918). The interferometer may be designed to monitor, for example, changes in optical path length, changes in physical path length, changes in refractive index, changes in wavelength of a beam, changes in direction of propagation of a beam, or changes in intrinsic gas properties along a path length. Generally, the interferometer directs a reference beam along a reference path (which may contact a reference object) and a measurement beam along a measurement path contacting a measurement object (e.g., a lithography stage), and then combines the reference and measurement beams to form an overlapping pair of exit beams. The interferometer may also be a muti-axis interferometer that makes measurements along multiple axes. In dispersion interferometry applications, there are overlapping pairs of exit beams for each of multiple wavelengths. The interference between the overlapping pair of exit beams contains information about the relative difference in optical path length between the reference and measurement paths. In some systems, the reference path is fixed and therefore changes in the optical path length difference correspond to changes in the optical path length of the measurement path. In other systmes, however, the optical path length of both the reference and measurement paths can be changing. For example, the reference path can contact a reference object (e.g., a column reference) that may move relative to the interferometer. In this latter case, the changes in the optical path length difference correspond to changes in the position of the measurement object relative to the reference object.

Interferometry systems such as those described above provide highly accurate measurements and are especially useful in lithography applications used in fabricating large scale integrated circuits, for example, computer chips. Lithography is a key technology driver for the semiconductor manufacturing industry. Overlay improvement is one of the five most difficult challenges down to and below 100 nm line widths (design rules), as mentioned in the *Semiconductor Industry Roadmap*, p82 (1997).

Overlay depends directly on the performance, i.e., accuracy and precision, of the distance measuring interferometers used to position wafer and reticle (or mask) stages. Since a lithography tool may produce $50–100 M/year of products, the economic value from improved performance distance measuring interferometers is substantial. Each 1% increase in yield of the lithography tool results in approximately $1 M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which is incorporated herein by reference.

Interferometry systems such as those described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 8:
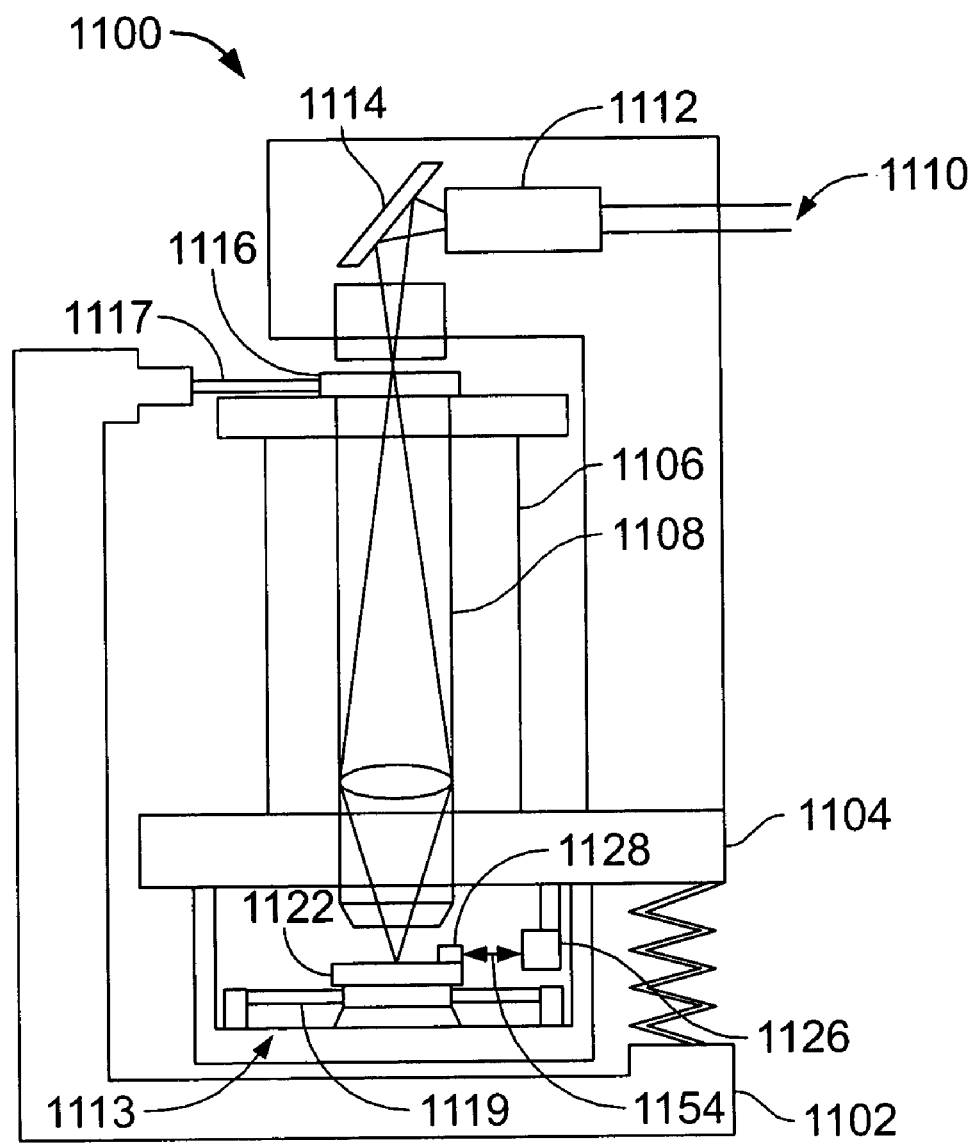
FIG. 8 shows a lithography scanner that includes an interferometry system.

An example of a lithography scanner 1100 using interferometry system 1126 is shown in FIG. 8. Interferometry system 1126 is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics.

In another example of a lithography scanner, one or more interferometry systems can also be used to precisely measure the position of mask stage 1116 as well as other moveable elements whose position must be accurately monitored in processes for fabricating lithographic structures.

Suspended below exposure base 1104 is a support base 1113 that carries wafer stage 1122. Stage 1122 includes a plane mirror 1128 for reflecting a measurement beam 1154 directed to stage 1122 by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to interferometry system 1126, which is mounted on exposure base 1104. Interferometry system 1126 may include any of the examples of interferometry systems described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other examples of the lithographic scanner, one or more of the interferometry systems described previously can be used to measure distances along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some examples, lithographic 1100 scanner can include what is known as a column reference. In such examples, interferometry system 1126 directs the reference beam (not shown) along an external reference path that contacts a reference mirror (not shown) mounted on some structure that directs the radiation beam, e.g., lens housing 1106. The reference mirror reflects the reference beam back to interferometry system 1126. An interference signal is produced by interferometry system 1126 by combining measurement beam 1154 reflected from stage 1122 and the reference beam reflected from a reference mirror mounted on the lens housing 1106. The interference signal indicates changes in the position of stage 1122 relative to the radiation beam. Furthermore, in other examples, interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 9:
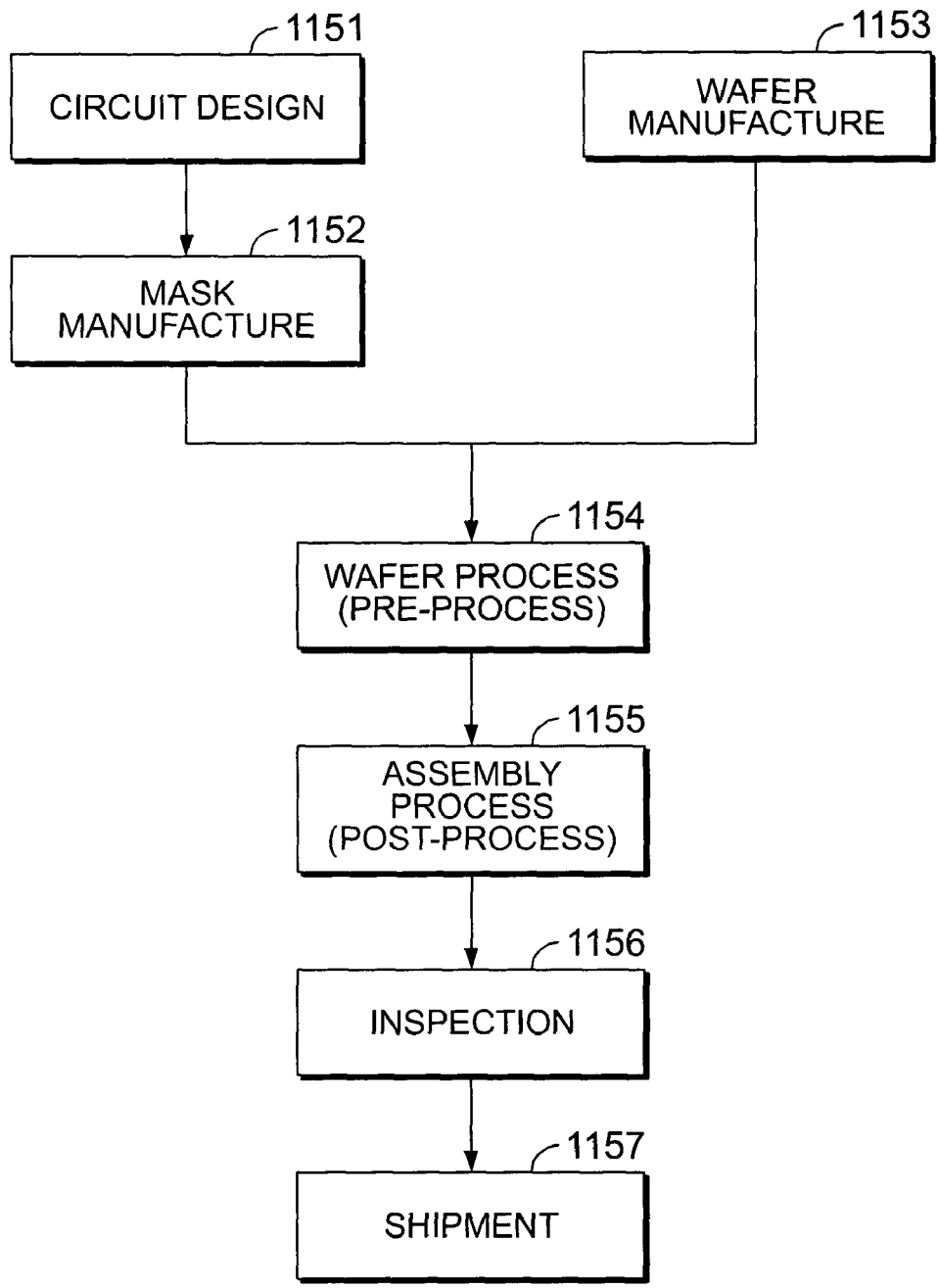
FIGS. 9 and 10 are flow charts that describe steps for making integrated circuits.

Lithography is a critical part of manufacturing methods for making semiconductor devices. For example, U.S. Pat. No. 5,483,343 outlines steps for such manufacturing methods. These steps are described below with reference to FIGS. 9 and 10. FIG. 9 is a flow chart of the sequence of manufacturing a semiconductor device such as a semiconductor chip (e.g., IC or LSI), a liquid crystal panel, or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the prepared mask and wafer, circuits are formed on the wafer through lithography. To form circuits on the wafer that correspond with sufficient spatial resolution those patterns on the mask, interferometric positioning of the lithography tool relative to the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 10:
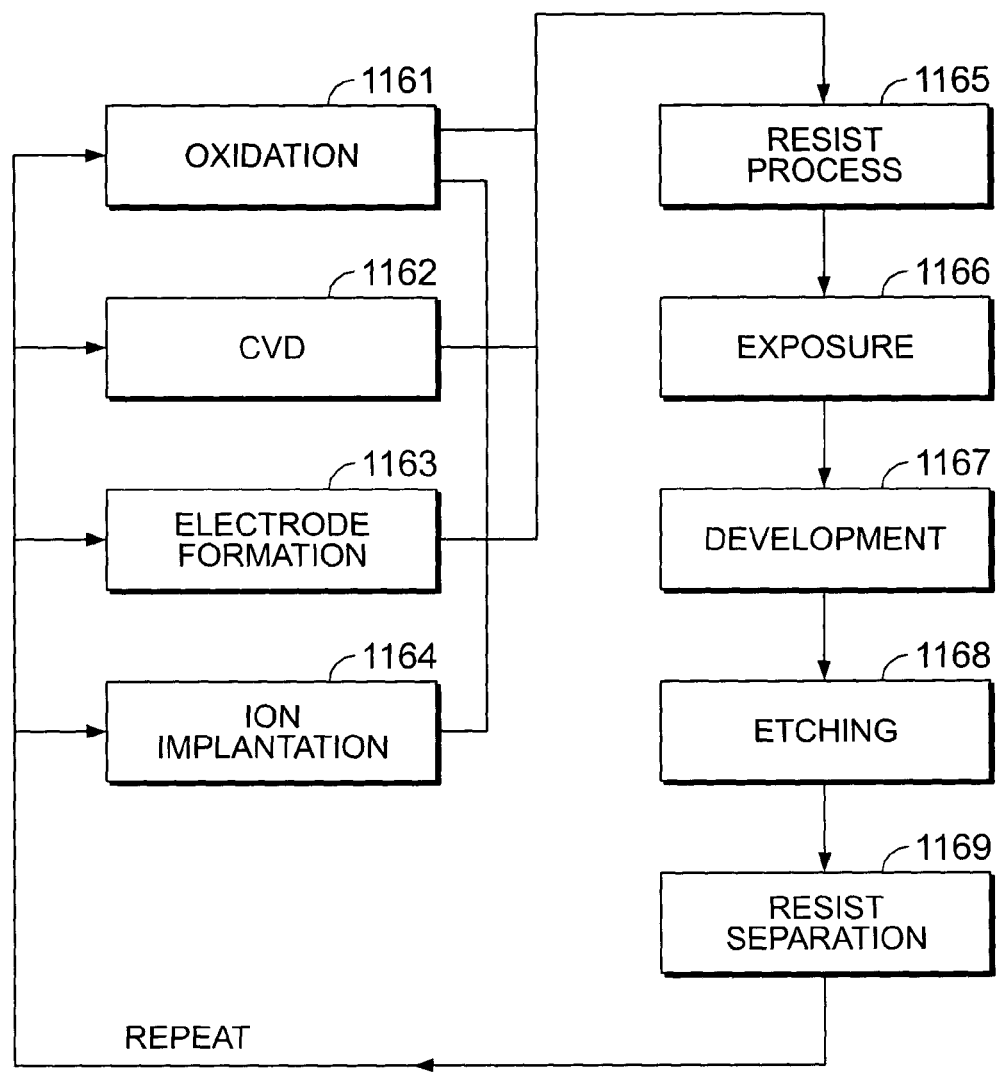

FIG. 10 is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 11:
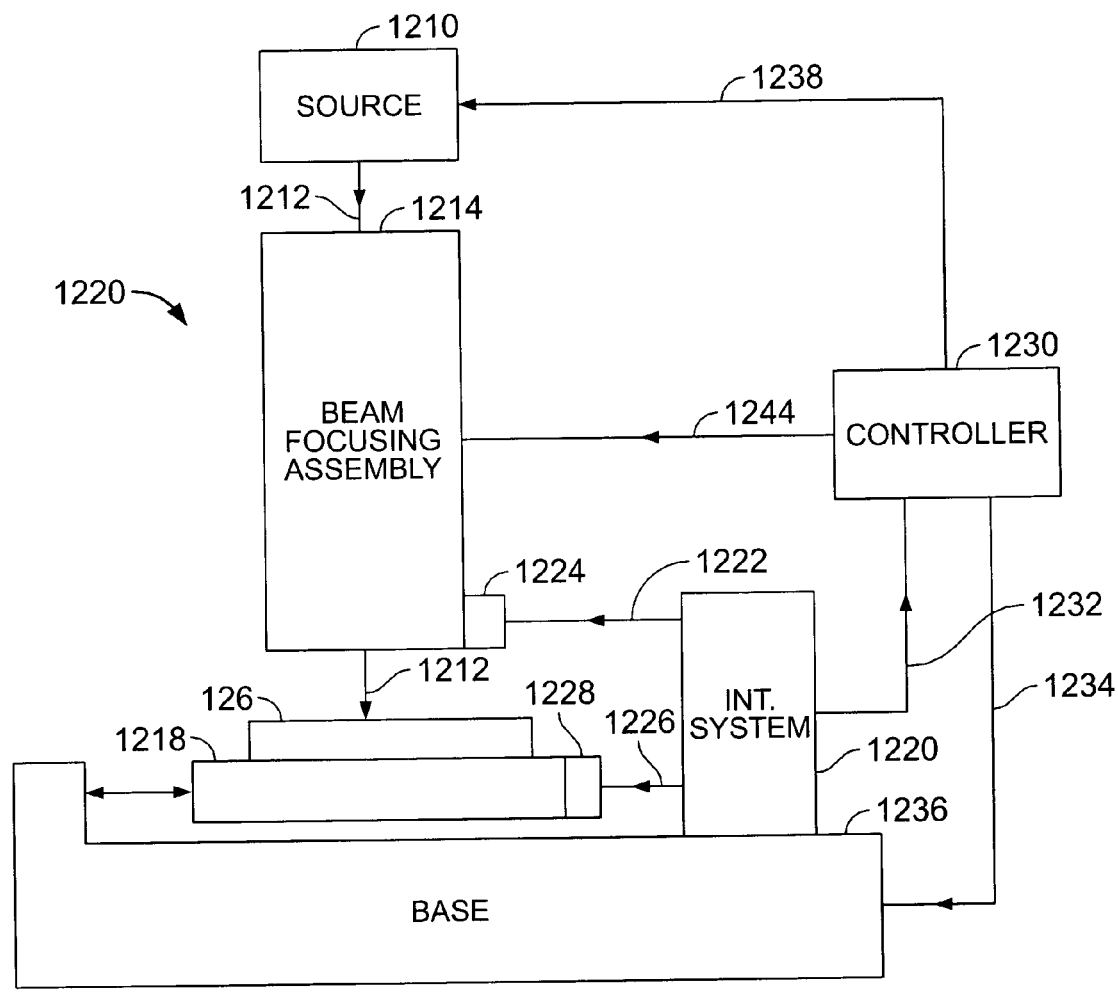
FIG. 11 shows a beam writing system that includes an interferometry system.

Referring to FIG. 11, an example of a beam writing system 1200 includes an interferometry system 1220 that uses a column reference. A source 1210 generates a write beam 1212. A beam focusing assembly 1214 directs the radiation beam to a substrate 1216 supported by a movable stage 1218. To determine the relative position of stage 1218, an interferometry system 1220 directs a reference beam 1222 to a mirror 1224 mounted on beam focusing assembly 1214 and a measurement beam 1226 to a mirror 1228 mounted on stage 1218.

Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts substrate 1216 with an intensity sufficient to cause photo physical or photochemical change only at selected positions of the substrate.

Furthermore, in some examples, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

Other aspects, features, and advantages are within the scope of the following claims.

What is claimed is:

1. An apparatus comprising:
    a corner cube retroreflector comprising three mutual perpendicular reflecting surfaces, the corner cube retroreflector defining a body diagonal; and
    a coating at each of the reflecting surfaces, the coating comprising at least one layer,
    wherein, for each of the reflecting surfaces, the coating causes a relative phase retardation $\epsilon$, defined by the phase angle in radians between p and s reflection coefficients at the reflecting surface, to be substantially equal to $\pi$ with respect to a plane of incidence including a normal to the reflecting surface and the body diagonal.

2. The apparatus of claim 1, wherein the coating at each of the reflecting surfaces comprises multiple layers.

3. The apparatus of claim 2, wherein the multiple layers comprise alternating high-refractive index and low-refractive index layers.

4. The apparatus of claim 2, wherein the multiple layers comprise at least one ZnS layer.

5. The apparatus of claim 4, wherein the multiple layers comprise at least one $MgF_2$ layer.

6. The apparatus of claim 2, wherein the multiple layers comprise at least one $Ta_2O_5$ layer.

7. The apparatus of claim 6, wherein the multiple layers comprise at least one $HfF_4$ layer.

8. The apparatus of claim 1, wherein the corner cube retroreflector comprises a solid corner cube retroreflector.

9. The apparatus of claim 1, wherein the corner cube retroreflector comprises a hollow corner cube retroreflector.

10. The apparatus of claim 1, wherein the coating further causes $\partial\epsilon/\partial\theta=0$ for some incident angle $\theta$ between 54.0 degrees and 55.5 degrees.

11. The apparatus of claim 1, wherein the coating further causes $\partial\epsilon/\partial D \leq 10$ for some incident angle $\theta$ between 54.0 degrees and 55.5 degrees, where D is an optical thickness of one of the coating layers.

12. The apparatus of claim 1, wherein, for each of the reflecting surfaces, the coating causes the relative phase retardation $\epsilon$ to be equal to $\pi$ within 10%.

13. The apparatus of claim 1, wherein, for each of the reflecting surfaces, the coating causes the relative phase retardation $\epsilon$ to be equal to $\pi$ within 5%.

14. The apparatus of claim 1, wherein, for each of the reflecting surfaces, the coating causes the relative phase retardation $\epsilon$ to be equal to $\pi$ within 2%.

15. An interferometry system comprising:
    an interferometer comprising the apparatus of claim 1.

16. The system of claim 15, wherein the interferometer is a high-stability plane mirror interferometer.

17. The system of claim 15, wherein the interferometer is a differential plane mirror interferometer.

18. The system of claim 15, wherein the interferometer is a Michelson interferometer.

19. The system of claim 15, wherein the interferometer is a dispersion interferometer.

20. The system of claim 15, wherein the interferometer is a multi-axis interferometer.

21. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
the interferometry system of claim 15 for monitoring the position of the wafer relative to the imaged radiation.

22. A lithography system for use in fabricating integrated circuits on a wafer, the system comprising:
a stage for supporting the wafer; and
an illumination system including a radiation source, a mask, a positioning system, a lens assembly, and the interferometry system of claim 15,
wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

23. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
the interferometry system of claim 15 for monitoring the position of the stage relative to the beam directing assembly.

24. An apparatus comprising:
a corner cube retroreflector comprising three mutual perpendicular reflecting surfaces, the corner cube retroreflector defining a body diagonal; and
a coating at each of the reflecting surfaces, the coating comprising at least one layer,
wherein the coating on each of the reflecting surfaces causes the corner cube retroreflector to have polarization eigenstates that are substantially linear, and to have a relative phase retardation $\delta$ due to the combined effect of the three reflecting surfaces that has a first and a second derivative with respect to a relative phase retardation $\epsilon$ that are each substantially less than $\pi$, where $\epsilon$ is a relative phase retardation at each reflecting surface, defined by the phase angle in radians between p and s reflection coefficients at the reflecting surface, with respect to a plane of incidence including a normal to the reflecting surface and the body diagonal.

25. The apparatus of claim 24, wherein the coating at each of the reflecting surfaces comprises multiple layers.

26. The apparatus of claim 25, wherein the multiple layers comprise alternating high-refractive index and low-refractive index layers.

27. The apparatus of claim 25, wherein the multiple layers comprise at least one ZnS layer.

28. The apparatus of claim 27, wherein the multiple layers comprise at least one $MgF_2$ layer.

29. The apparatus of claim 25, wherein the multiple layers comprise at least one $Ta_2O_5$ layer.

30. The apparatus of claim 29, wherein the multiple layers comprise at least one $Hf_4$ layer.

31. The apparatus of claim 24, wherein the corner cube retroreflector comprises a solid corner cube retroreflector.

32. The apparatus of claim 24, wherein the corner cube retroreflector comprises a hollow corner cube retroreflector.

33. The apparatus of claim 24, wherein the coating further causes $\partial\epsilon/\partial\theta=0$ for some incident angle $\theta$ between 54.0 degrees and 55.5 degrees.

34. The apparatus of claim 24, wherein the coating further causes $\partial\epsilon/\partial D \leq 10$ for some incident angle $\theta$ between 54.0 degrees and 55.5 degrees, where D is an optical thickness of one of the coating layers.

35. The apparatus of claim 24, wherein the first and second derivatives of $\delta$ with respect to $\epsilon$ are each substantially less than a third derivative of $\delta$ with respect to $\epsilon$.

36. An interferometry system comprising:
an interferometer comprising the apparatus of claim 24.

37. The system of claim 36, wherein the interferometer is a high-stability plane mirror interferometer.

38. The system of claim 36, wherein the interferometer is a differential plane mirror interferometer.

39. The system of claim 36, wherein the interferometer is a Michelson interferometer.

40. The system of claim 36, wherein the interferometer is a dispersion interferometer.

41. The system of claim 36, wherein the interferometer is a multi-axis interferometer.

42. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
the interferometry system of claim 36 for monitoring the position of the wafer relative to the imaged radiation.

43. A lithography system for use in fabricating integrated circuits on a wafer, the system comprising:
a stage for supporting the wafer; and
an illumination system including a radiation source, a mask, a positioning system, a lens assembly, and the interferometry system of claim 36,
wherein during operation the source directs radiation through the mask to produce spatially patterned radiation, the positioning system adjusts the position of the mask relative to the radiation from the source, the lens assembly images the spatially patterned radiation onto the wafer, and the interferometry system monitors the position of the mask relative to the radiation from the source.

44. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
the interferometry system of claim 36 for monitoring the position of the stage relative to the beam directing assembly.

* * * * *